(12) United States Patent
Stewart

(10) Patent No.: US 11,552,896 B2
(45) Date of Patent: Jan. 10, 2023

(54) FILTERING NETWORK TRAFFIC FROM AUTOMATED SCANNERS

(71) Applicant: salesforce.com, inc., San Francisco, CA (US)

(72) Inventor: Zachary Stewart, Atlanta, GA (US)

(73) Assignee: Salesforce, Inc., San Francisco, CA (US)

(*) Notice: Subject to any disclaimer, the term of this patent is extended or adjusted under 35 U.S.C. 154(b) by 8 days.

(21) Appl. No.: 16/842,288

(22) Filed: Apr. 7, 2020

(65) Prior Publication Data

US 2021/0314269 A1 Oct. 7, 2021

(51) Int. Cl.
*G06F 15/16* (2006.01)
*H04L 47/2441* (2022.01)
*H04L 47/28* (2022.01)

(52) U.S. Cl.
CPC .......... *H04L 47/2441* (2013.01); *H04L 47/28* (2013.01)

(58) Field of Classification Search
CPC ..... H04L 47/28; H04L 47/2441; H04L 51/02; H04L 63/1416; H04L 51/04; H04L 2463/144; H04L 67/02; H04L 51/046
USPC ........................................................ 709/225
See application file for complete search history.

(56) References Cited

U.S. PATENT DOCUMENTS

| | | | |
|---|---|---|---|
| 7,647,398 B1 * | 1/2010 | Fan | H04L 51/22 709/224 |
| 11,017,330 B2 * | 5/2021 | Dodson | G06F 17/18 |
| 2011/0154474 A1 * | 6/2011 | Siegel | G06Q 10/107 726/12 |
| 2017/0289088 A1 * | 10/2017 | Quintero | H04L 51/12 |
| 2018/0183822 A1 * | 6/2018 | Tan | H04L 51/04 |

(Continued)

FOREIGN PATENT DOCUMENTS

| | | | | |
|---|---|---|---|---|
| EP | 3654259 A1 * | 5/2020 | ........... | G06Q 10/107 |
| WO | WO-2010065991 A * | 6/2010 | ......... | H04L 63/1416 |

(Continued)

OTHER PUBLICATIONS

A multi-dimensional spam filtering framework based on threat intelligence Xiaopeng Tian;Di Tang 2019 12th International Symposium on Computational Intelligence and Design (ISCID) (Year: 2019).*

(Continued)

*Primary Examiner* — Oscar A Louie
*Assistant Examiner* — Oluwatosin M Gidado
(74) *Attorney, Agent, or Firm* — Holland & Hart LLP

(57) ABSTRACT

Methods, systems, and devices for filtering network traffic from automated scanner are described. A device (e.g., an application server) may receive an activity message associated with an interaction with an electronic communication message and identify, from the activity message, at least a source identifier of the activity message and one or more attributes associated with the electronic communication message. The device may then add the activity message to a mapping of source identifiers and attributes associated with previously received activity messages and classify the activity message as being associated with an automated scanner based on a comparison of the received activity message to the mapping over a previous time window. Upon classifying the activity message, the device may transmit a classification result to an external server.

20 Claims, 11 Drawing Sheets

(56) References Cited

U.S. PATENT DOCUMENTS

| | | | | |
|---|---|---|---|---|
| 2018/0343313 A1* | 11/2018 | Au | ............... | H04L 67/22 |
| 2019/0190877 A1* | 6/2019 | Yan | ............... | H04L 51/52 |
| 2020/0380408 A1* | 12/2020 | Sridhar | ............ | H04L 9/0643 |
| 2020/0410548 A1* | 12/2020 | Lombas | ........... | G06Q 30/0272 |
| 2021/0152496 A1* | 5/2021 | Kim | ............ | H04L 51/02 |

FOREIGN PATENT DOCUMENTS

| | | | | |
|---|---|---|---|---|
| WO | WO-2018106974 A1 * | 6/2018 | ......... | G06F 16/212 |
| WO | WO-2019164630 A1 * | 8/2019 | ....... | H04N 21/44204 |

OTHER PUBLICATIONS

Spam filtering email classification (SFECM) using gain and graph mining algorithm M. K. Chae;Abeer Alsadoon;P.W.C. Prasad;Sasikumaran Sreedharan 2017 2nd International Conference on Anti-Cyber Crimes (ICACC) (Year: 2017).*

SpiderTrap—An Innovative Approach to Analyze Activity of Internet Bots on a Website Piotr Lewandowski;Marek Janiszewski;Anna Felkner IEEE Access Year: 2020 | vol. 8 | Journal Article | Publisher: IEEE (Year: 2020).*

Demo Abstract: TotTernary—A Wearable Platform for Social Interaction Tracking Andreas Biri;Pat Pannuto;Prabal Dutta 2019 18th ACM/IEEE International Conference on Information Processing in Sensor Networks (IPSN) Year: 2019 | Conference Paper | Publisher: IEEE (Year: 2019).*

* cited by examiner

FILTERING NETWORK TRAFFIC FROM AUTOMATED SCANNERS

FIELD OF TECHNOLOGY

The present disclosure relates generally to database systems and data processing, and more specifically to filtering network traffic from automated scanners.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

In some cases, CRM solutions, among other solutions (e.g., marketing solutions, etc.), may benefit from data analytics. Applications supporting artificial intelligence enhanced data analytics may greatly increase the scope of data processing and model generation by automating much of the data analysis process. For instance, data analysis related to marketing emails may be used to develop marketing models for users. Marketing emails may include tracking features such as open rates, click rates, and unsubscribe rates. In some instances, these tracking features can be inadvertently affected by automated scanners (e.g., email security scanners). Conventional marketing systems may implement data analytics applications that may not consider an activity of automated scanners when calculating engagement metrics for a user. Specifically, current techniques lack the ability to identify an automated scanner from tracking one or more engagement activities associated with marketing emails.

DETAILED DESCRIPTION

Figure 1:
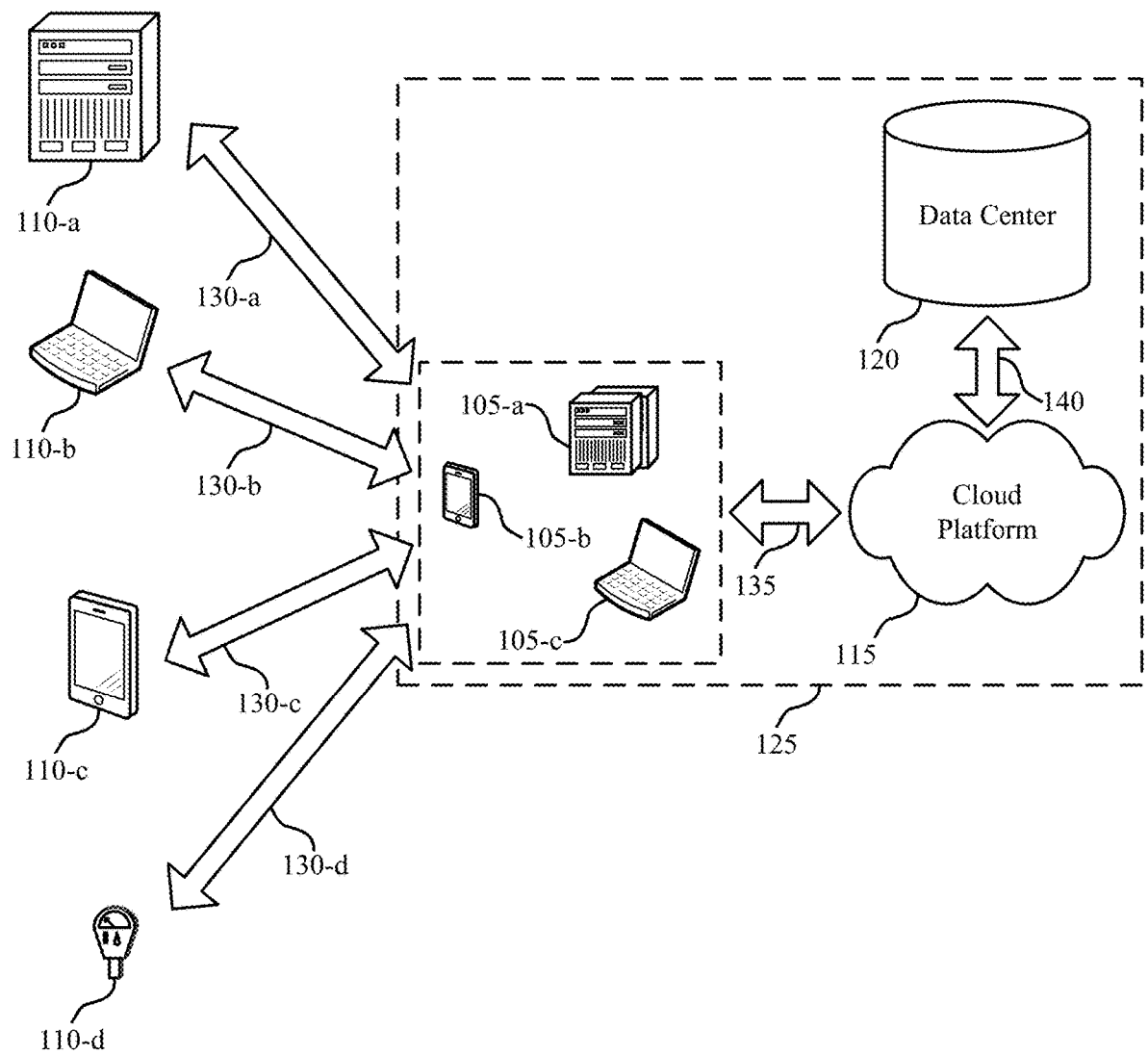
FIG. 1 illustrates an example of a system for filtering network traffic that supports filtering network traffic from automated scanners in accordance with aspects of the present disclosure.

Some systems (e.g., artificial intelligence systems supporting customer relationship management (CRM) and one or more datasets) may support a user-friendly, interactive data analytics application. Such an application may receive a request to run one or more artificial intelligence models (such as a classification model) on different data sets. As one example, a user may input a request to run a classification model into a data analytics application running on a user device. In some cases, the data analytics application on the user device may transmit the request to a server (such as an application server). Additionally or alternatively, a first server may transmit a classification request to a second server (e.g., an application server) based on receiving data from a load balancer. In one example, the application server may receive an activity message associated with an interaction with an electronic communication message (e.g., email). The application server, upon receiving the request, may identify at least a source identifier of the activity message and one or more attributes associated with the electronic communication message. The interaction with the electronic communication message may be generated by an automated scanner instead of a user. For example, an automated scanner may open an email, click a link within an email, click an invisible link within an email, or some combination of these actions. However, conventional systems may not be able to differentiate between an interaction generated by an automated scanner and an interaction generated by a human. It may therefore be desirable to develop a more robust artificial intelligence model that filters network traffic and classifies activity messages as being associated with an automated scanner.

Marketing emails may include tracking features such as open rates, click rates, and unsubscribe rates. In some examples, a marketer may use the tracking features to determine whether a user is engaged with an email. However, these tracking features can be inadvertently affected by automated scanners (e.g., email security scanners). Typically, email security scanners are configured to open an incoming email prior to delivering the email to the recipient's inbox. Email security scanners are often deployed in a workplace environment, where each incoming email is scanned for malicious content prior to it being delivered to an employee's inbox. Additionally, email security scanners may also visit Uniform Resource Locators (URLs) embedded in incoming emails to scan for malicious content. Such activity of the email security scanners may result in skewed engagement metrics calculated by a marketer. For instance, a marketer may erroneously identify an activity from an automated scanner as an activity from an intended recipient.

In certain cases, a marketer may identify an activity from an automated scanner as a human activity, and may tailor targeted emails based on the activity. It may be difficult for marketers to block these automated security scanners (e.g., email security scanners) at a network level. Often times, such automated scanners are hosted by cloud providers on IP addresses that tend to change, or by institutions that put these scanner behind the same network interface as their users. Blocking the automated scanners at a network level may also result in blocking legitimate users at the network level. Thus, there exists a need to detect and filter network traffic generated from automated scanners.

According to one or more aspects of the present disclosure, a device (e.g., a user device, server, server cluster, database, etc.) may perform any combination of the following techniques and procedures to filter network traffic generated from automated scanners using one or more classification models. Specifically, the device may implement a series of algorithms that can apply and evaluate interaction data in an iterative fashion. According to one or more aspects, the artificial intelligence system reactively filters traffic from one or more automated scanners by monitoring incoming traffic from all network addresses (e.g., Internet Protocol (IP) addresses or agents). For example, the artificial intelligence system may receive a request (such as a request from another server or a user device using an analytics application) to run an artificial intelligence model (e.g., a supervised machine learning model) to classify network traffic. Particularly, the artificial intelligence system develops one or more signals for network addresses associated with an engagement activity. For instance, the artificial intelligence system develops the one or more signals based on a source identifier and one or more attributes associated with an engagement activity.

In some aspects, the artificial intelligence system may then temporarily throttle traffic from a network address based on the one or more signals (such as, when a signal satisfies a certain threshold). According to some aspects, the artificial intelligence system develops these signals based on a type of tracked activity performed by the IP address (such as opening of an email, clicking a tracked link, unsubscribing from a list, etc.). The artificial intelligence system also aggregates information (e.g., number of distinct customers, number of distinct emails, number of distinct links, etc.) associated with one or more emails interacted by an agent (or IP address). Based on the developed signals and the aggregated information, the artificial intelligence system may classify an agent as an automated security scanner (or bot).

According to one or more aspects of the present disclosure, the artificial intelligence system (such as an artificial intelligence system hosted at an application server) may then receive an activity message associated with an interaction (e.g., open, close, click, etc.) with an email (e.g., a marketing email). Upon receiving the activity message, the artificial intelligence system may identify at least a source identifier of the activity message and one or more attributes associated with the email. In an example, the artificial intelligence system may maintain a mapping between source identifiers and one or more attributes of activity messages. That is, the artificial intelligence system may receive one or more activity messages associated with a network address for a period of time, and maintain the mapping. Upon receiving a new activity message, the artificial intelligence system may add the activity message to the mapping of source identifiers and attributes associated with previously received activity messages. As described herein, the artificial intelligence system may develop one or more signals associated with the source identifier (e.g., IP address or network address). The artificial intelligence system may identify additional information associated with the IP address, and determine whether the IP address is associated with a bot based on the developed signals and identified information. For instance, the artificial intelligence system may classify an activity message as being associated with an automated scanner based on a comparison of the received activity message to the mapping over a previous time window. For example, the system may determine that a particular IP address is responsible for opening a high number (e.g., exceeding a configurable threshold) of emails within a relatively small (e.g., falling below a configurable threshold) period of time. Similarly, the system may determine that a particular IP address is responsible for opening emails from a threshold number of customers within a threshold period of time. In some examples, the system may determine that a particular IP address is responsible for clicking a threshold number of links within a threshold period of time or responsible for clicking a threshold number of links from a threshold number of customers within a threshold period of time. Other examples of signals may include the number of honeypot links clicked within a threshold time or the number of links clicked within a threshold time regardless of the associated email account. All of these threshold values may be tunable and configurable based on the desired sensitivity of the model. These examples of signals may indicate that the interaction messages coming from one or more IP addresses are the result of an automated email scanner (or some other automated security system) rather than the result of actual human interaction with the emails.

In some cases, the artificial intelligence system may transmit a classification result based on classifying the activity message. That is, the artificial intelligence system may indicate to another server, that a particular activity message and/or IP address is associated with an automated scanner (or is likely associated with an automated scanner based on a confidence score or threshold associated with the classification). In some examples, upon identifying non-bot-like activity from a network address for a threshold time period, the artificial intelligence system may cease classifying the network address as an automated scanner.

A marketer may use this artificial intelligence model for data analysis and predictive purposes, where the features included in this model ensure that the outcomes of the model result in separating an activity generated from an automated scanner from an activity generated by a user.

Aspects of the disclosure are initially described in the context of an environment supporting an on-demand database service. Additional aspects are described with reference to filtering procedures, and systems that support filtering network traffic from automated scanners. Aspects of the disclosure are further illustrated by and described with reference to apparatus diagrams, system diagrams, and flowcharts that relate to filtering network traffic from automated scanners.

FIG. 1 illustrates an example of a system 100 for cloud computing that supports filtering network traffic from automated scanners in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-*b*), or a laptop (e.g., cloud client 105-*c*). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to certain applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-*a*, 130-*b*, 130-*c*, and 130-*d*). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-*a*), a laptop (e.g., contact 110-*b*), a smartphone (e.g., contact 110-*c*), or a sensor (e.g., contact 110-*d*). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

A device (e.g., any component of subsystem 125, such as a cloud client 105, a server or server cluster associated with the cloud platform 115 or data center 120, etc.) may perform any combination of the following techniques and procedures to provide security for filtering network traffic from automated scanners. For example, the device (e.g., a user device, server, server cluster, database, etc.) may receive a request to run an artificial intelligence model (e.g., a mathematical model or a machine learning model). In some aspects, the device may receive a request (such as a request from a server) to run an artificial intelligence model to classify network traffic. The device may be configured to identify one or more signals for network addresses (e.g., source identifiers, IP addresses, etc.) associated with an activity message. The device may receive an activity message associated with an interaction with an electronic communication message. Upon receiving the activity message, the device may identify at least a source identifier of the activity message and one or more attributes associated with the electronic communication message. In one example, the device may maintain a mapping between source identifiers and attributes associated with preciously received activity messages. In response to identifying the source identifier of the activity message and one or more attributes associated with the electronic communication message, the device may add the activity message to the mapping. The device may utilize one or more signals to classify the activity message as being associated with an automated scanner. For instance, the device may classify the activity message as being associated with an automated scanner based on a comparison of the received activity message to the mapping over a previous time window. In some cases, the device may then transmit, to an external server, a classification result based on classifying the activity message.

In some aspects, the device may maintain the mapping of source identifiers and attributes associated with previously received activity messages according to a timestamp associated with an activity message. For instance, upon receiving an activity message associated with an interaction with an electronic communication message, the device may identify a timestamp associated with the electronic communication message. For example, the device may determine a time when the electronic communication message was delivered. In one example, the device may determine that the timestamp corresponds to a previous time window. Alternatively, the device may determine that a previous time window is not available. In such a case, the device may initiate a mapping between one or more attributes associated with the electronic communication message and a source identifier of the activity message. In some aspects, the mapping may be stored at the device. In some cases, the device may associate the timestamp of the electronic communication message with the mapping.

As described herein, the device may develop or identify one or more signals based on the mapping. For example, the device may determine one or more signals associated with the source identifier of the activity message based on the mapping of source identifiers and the attributes associated with previously received activity messages. In some cases, the device may identify a set of activity messages associated with the source identifier within a previous time window, where the set of activity messages include a set of interactions of the source identifier with a set of electronic communication messages. In one example, the set of interactions of the source identifier may include opening of the set of electronic communication messages within the previous time window. Additionally or alternatively, the set of interactions of the source identifier may include the set of interactions with a set of customers associated with the set of electronic communication messages. Additionally or alternatively, the set of interactions of the source identifier may include the set of interactions with a link included in one or more of the set of electronic communication messages. Additionally or alternatively, the set of interactions of the source identifier may include the set of interactions with a link included in one or more of the set of electronic communication messages, the one or more of the set of electronic communication messages being associated with one or more customers.

Some conventional systems may implement data analytics applications that do not sufficiently filter network traffic generated by automated scanners. For example, marketers use data analytics application to analyze engagement metrics associated with marketing emails. Often times, marketing emails include engagement tracking features such as open rates, click rates, and unsubscribe rates. In some cases, a marketer can gather data associated with click rates (i.e., a rate of clicking on an URL embedded within a marketing email) in a marketing email and may develop marketing strategies based on the click rates. For example, the marketer may determine that a user has clicked on an URL related to a particular product. In such an example, the marketer may decide to increase marketing efforts directed towards that product. That is, in conventional systems, a marketer may use the tracking features to determine whether a user is engaged with an email, and if the marketer determines that the user is engaged with the email, then the marketer may develop a marketing strategy based on the engagement.

In some examples, automated scanners may be deployed to identify malicious content included in an email. Additionally or alternatively, automated scanners (such as email security scanners) may determine whether an email includes a spam email. In some cases, automated scanners may open an incoming email prior to delivering the email to the recipient's inbox. Additionally or alternatively, automated scanners may also open a link included in an email to verify whether the link is legitimate. However, the activity of these automated scanners (e.g., email security scanners) may inadvertently skew the tracking features of an email. For example, a marketer may mistakenly assume such activity of the email security scanners as an activity of a user (e.g., a human). Such automated scanners may affect the engagement metrics calculated by a marketer. Additionally, it may be difficult for marketers to block the automated security scanners (e.g., email security scanners) at a network level. With concerns about skewed engagement activities associated with a marketing email, it is desirable to filter network traffic. That is, it is desirable to develop a more robust artificial intelligence model that detect and filter network traffic generated from automated scanners.

In contrast, system 100 implements procedures and techniques for detecting and filtering network traffic generated from automated scanners using artificial intelligence models while also ensuring low probability of a system classifying a legitimate user as an automated scanner (or a bot). For example, the system 100 supports a series of algorithms that can apply and iteratively evaluate results received from running the artificial intelligence models, such that a marketer is able to classify engagement activities generated by an automated scanner from engagement activities generated by a user. In particular, the system 100 reactively filters traffic from one or more automated scanners by monitoring incoming network traffic from all sources (such as IP addresses). The system 100 maintains a mapping between engagement attributes and source identifiers of multiple emails, and develops signals for each network address based on the mapping. In one example, the system 100 may receive a request (from a server or a user device) to ascertain whether a visitor activity (such as an interaction with an email) is generated from an automated scanner (e.g., email security scanner). The system 100 may classify the visitor activity as traffic generated from the automated scanner based on the patterns of traffic previously received from the same source identifier. The system 100 may determine that a network address (or IP address) is associated with an automated scanner (or bot) based on identifying a sharp spike in the number of emails opened in a short time window. Additionally or alternatively, the system 100 may classify an IP address as an automated scanner based on determining that a total number of different customer accounts interacted with by the IP address during a time period is larger than a total number of different customer accounts interacted with by a different IP address.

In one examples, the system 100 may maintain a log of recent visitor activities, for a previous window of time (e.g., 10 seconds). In one example, the system 100 may maintain a list of visitor activities that corresponds to a time window. As the system 100 receives additional visitor activities (i.e., as the system 100 moves forward in time), the system 100 may add new elements to a head (i.e., most recent time) of the list, and truncate a tail of the list to maintain a fixed size of the time window. In some instances, the system 100 may maintain a linked list structure to store the visitor activities. This linked list structure provides with the ability to ingest new information on a rolling basis, as well as calculate the likelihood that a given request is generated from an automated scanner. According to one or more aspects of the present disclosure, the system 100 may identify data from each visitor activity and the data may be used to inform the classification of future visitor activities. In some cases, the system 100 may maintain a sliding window for a list of elements associated with one or more visitor activities. Upon receiving a request to classify a visitor activity (or engagement activity), the system 100 may compare a timestamp of the request to a timestamp of a head element (i.e., a most recent request evaluated by the system 100) of the list. The timestamp of the request may be used to determine whether the request is to be included within the previous time window or to be added (i.e., at the tail of the list). In case the request includes a timestamp that is later than the timestamp of the most recent requests of the list, then the system 100 adjusts the time window to add the request.

In some examples, the system 100 may examine one or more attributes of the requests included in the time window to develop one or more signals. For example, the system 100 may query each of the one or more attributes to determine statistical information pertaining to a particular IP address, tenant, and asset (e.g., email id) associated with a request. The system 100 may aggregate the statistics together to determine whether the request is generated from an automated scanner. For instance, the system 100 may analyze the one or more attributes identified from one or more visitor activities to calculate a set of metrics for an IP address. In some examples, the set of metrics may include a number of accounts opened by the IP address within the last N seconds. If the system 100 determines that the number of accounts opened by the IP address within the last N seconds satisfies a threshold, then the system 100 may classify the IP address as an automated scanner. Additionally or alternatively, the set of metrics may be based on a kind of tracked activity performed by the IP address (e.g., opening an email, clicking a tracked link, clicking an invisible link, unsubscribing from the list, etc.). In some cases, the system 100 may determine a number of unique customers interacted with by the IP address. For example, the system 100 may determine that the IP address is associated with an automated scanner based on determining how many distinct customers has the IP address opened an email from within the past minute.

In some cases, upon identifying an IP address as a potential automated scanner (e.g., email security scanner or bot), the system 100 may temporarily throttle traffic from that IP address. In some cases, the system 100 may transmit a classification result based on classifying the activity message as being associated with an automated scanner.

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
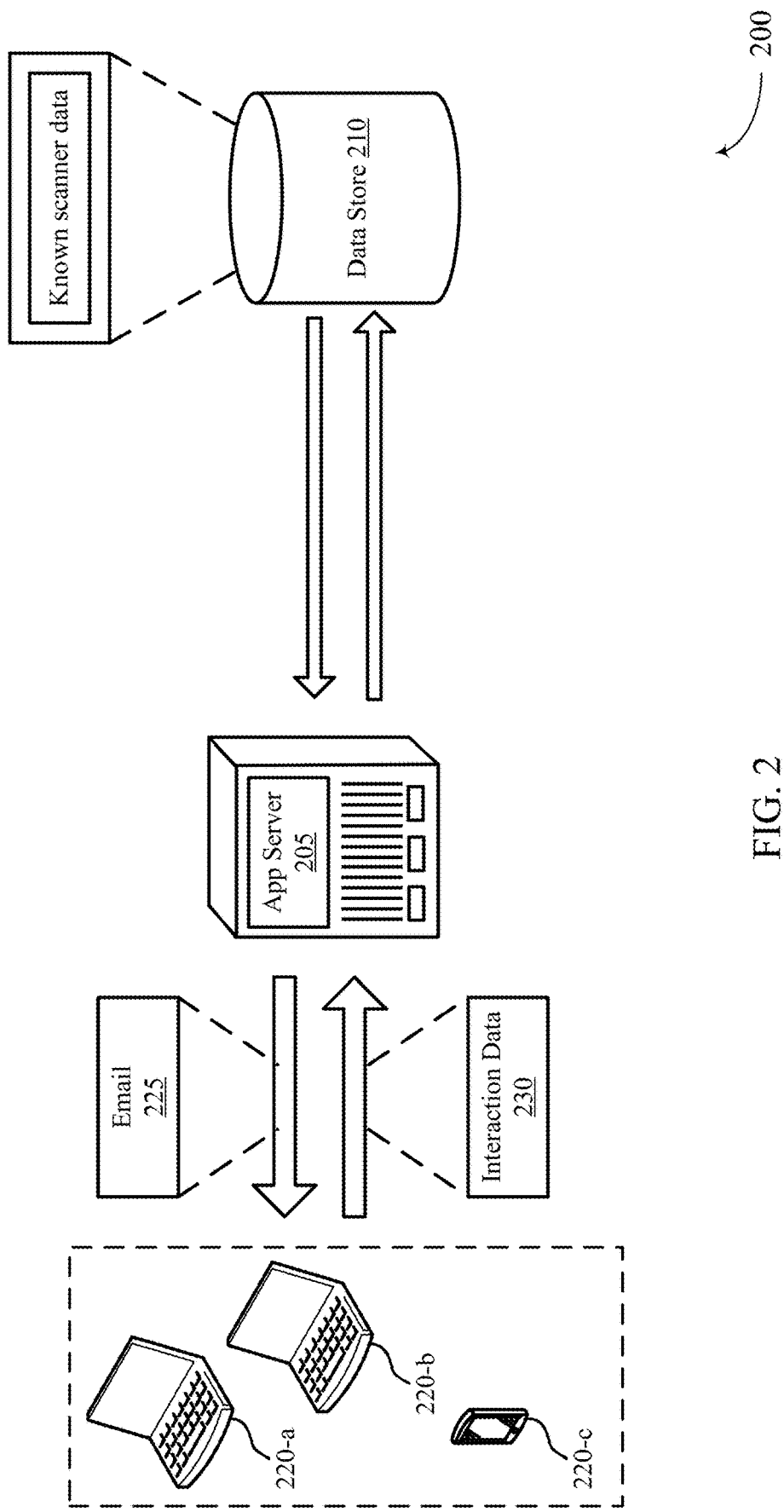
FIG. 2 illustrates an example of a system that supports filtering network traffic from automated scanners in accordance with aspects of the present disclosure.

FIG. 2 illustrates an example of a system 200 that supports filtering network traffic from automated scanners in accordance with aspects of the present disclosure. The system 200 may include an application server 205 (e.g., a device), a data store 210, and one or more user devices 220 (e.g., user device 220-*a*, user device 220-*b*, and user device 220-*c*). In some cases, the functions performed by the application server 205 may instead be performed by a component of the data store 210, or the user devices 220. The user devices 220 (e.g., user device 220-*a*, user device 220-*b*, and user device 220-*c*) may support an application for data analytics. Although not depicted in the example of FIG. 2, the application server 205 may support communication with an external server. Specifically, the user device 220 in combination with the external server and the application server 205 may support an application that provides filtering network traffic from automated scanners using artificial intelligence models. A user operating an external server may interact with the application server 205 to transmit a classification request to the application server 205. The application server 205 may identify outcomes of filtering incoming network traffic using the artificial intelligence model, and may provide the outcomes to an external server (not shown).

In some aspects, the external server (not shown) may transmit a classification request to the application server 205. Additionally or alternatively, a user (e.g., a marketer) operating the user device 220 may transmit the classification request to the application server 205. The user device 220 may display an interactive interface for receiving a request to filter network traffic using an artificial intelligence model (e.g., a classification model, or machine learning model). In some cases, this interface may run as a webpage within a web browser (e.g., as a software as a service (SaaS) product). In other cases, this interface may be part of an application downloaded onto the user device 220. A user operating the user device 220 may input information into the user interface to specify aspects of the request to classify network traffic. As one example, the user device 220 hosting an application for running an artificial intelligence system may be used by a marketer. The marketer (such as a user operating the user device 220) may submit known information about one or more marketing emails to the user device 220 for evaluation. For example, the marketer may request the application server 205 to run the artificial intelligence model to determine whether an interaction activity associated with an email is generated by an automated scanner. In some cases, a user (such as the marketer) may be associated with a user credential or user identifier (ID), and the user may log on to the user device 220 using the user credential. For example, if a user is part of a specific organization, the application server 205 may identify the organization using the user credential, and may run the artificial intelligence model on the data store 210 associated with that organization. In some cases, the application server 205 may run the artificial intelligence model on the data store 210 associated with that organization. For instance, the known scanner data stored in the data store 210 may be associated with the organization. In this way, the application server 205 may provide classification results by running the artificial intelligence model, such that the marketer may identify automated scanners.

In some examples, the application server 205 in conjunction with one or more servers (such as marketing servers or other devices) may send one or more electronic communication messages (e.g., emails 225) to one or more user devices 220. Such electronic communication messages may include marketing emails generated by a marketer. The marketing emails may often include tracking features (e.g., open tracking, click tracking, URLs, honeypot links, etc.) to track user interactions with the marketing emails. The application server 205 in conjunction with one or more external servers may receive interaction data 230 from the user devices. In some cases, the external server may transmit a classification request to classify network activity (e.g., activity messages), and the application server 205 may filter the activity messages based on receiving the classification request.

According to one or more aspects, the application server 205 may receive an activity message (including interaction data 230) associated with an interaction with the electronic communication message. For example, the application server 205 may identify that a marketing email has been interacted with at a user device 220. Upon receiving the activity message, the application server 205 may identify at least a source identifier of the activity message and one or more attributes associated with the electronic communication message. For example, the source identifier of the activity message may include an IP address associated with the activity message, and the one or more attributes associated with the electronic communication message may include at least one of an account identifier associated with the electronic communication message, an electronic communication message identifier, a timestamp associated with the electronic communication message, an identifier associated with a type of activity, or a combination thereof. In one example, the application server 205 may identify the IP address of the device that interacted with the electronic communication message. The application server 205 may then identify a timestamp associated with the electronic communication message. For example, the application server 205 may determine a time during which the electronic communication message was interacted with by the IP address.

In some examples, the application server 205 may then add the activity message to a mapping of source identifiers and attributes associated with previously received activity messages. The application server 205 may store the mapping of source identifiers and attributes associated with previously received activity messages in the data store 210. In some examples, the application server 205 may add the activity message to the mapping based on the identified timestamp. The application server 205 may then compare the received activity message to the mapping over a previous time window. In some cases, the application server 205 may determine the previous time window based on the timestamp associated with the electronic communication message. After comparing the received activity message, the application server 205 may classify the activity message as being associated with an automated scanner based on a comparison of the received activity message to the mapping over a previous time window. For example, the application server 205 may classify that the IP address associated with a received activity message belongs to an automated scanner. As described herein, the automated scanner may include an email security scanner. In some cases, the application server 205 may transmit, to an external server, a classification result based on classifying the activity message. The external server may in turn forward the classification result to the marketer. In some examples, the application server 205 may forward the classification results to the marketer. In addition to transmitting the classification results, the application server 205 may store the classification result in the data store 210 (e.g., as part of known scanner data).

Figure 3:
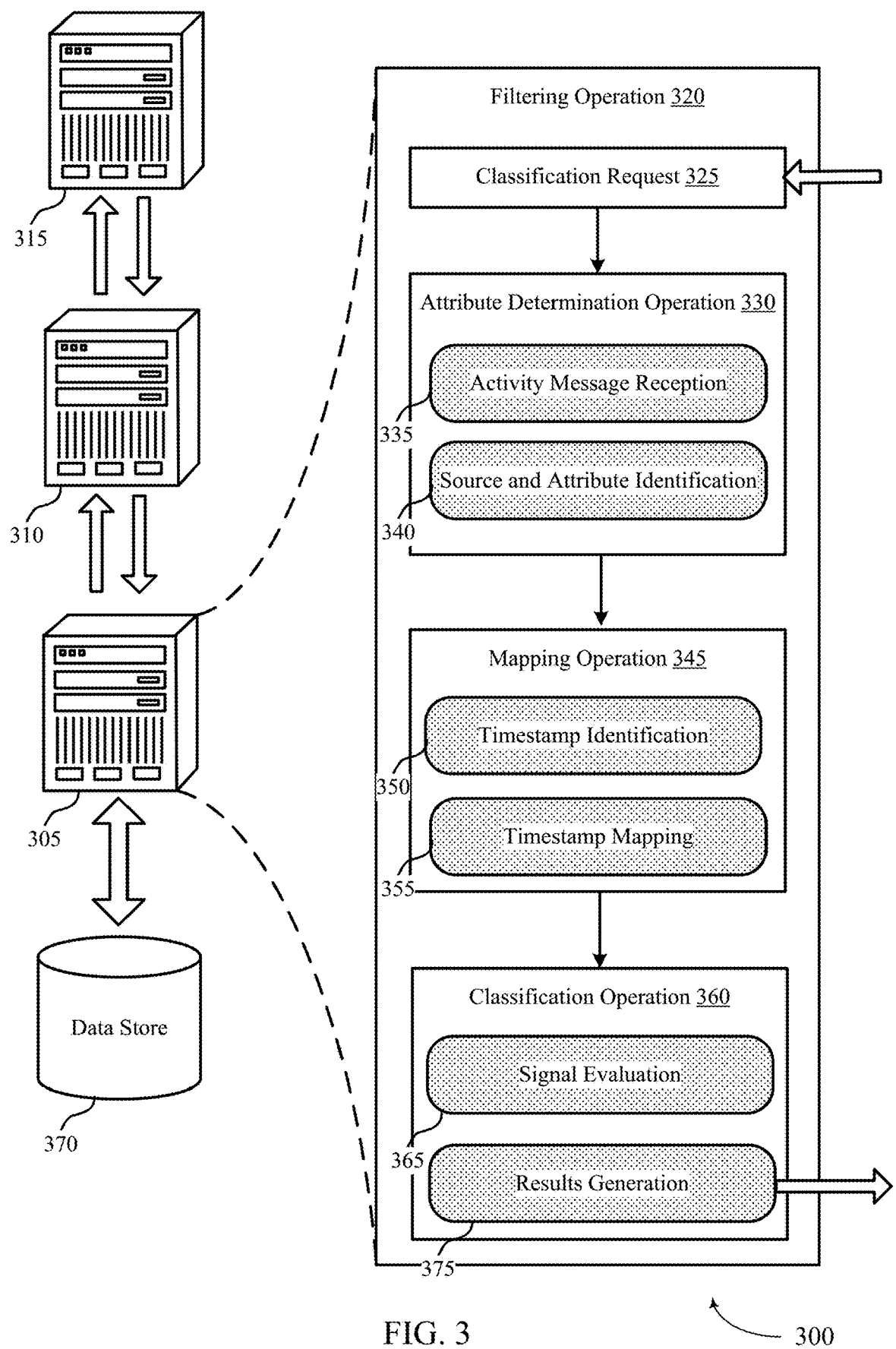
FIG. 3 illustrates an example of a system that supports filtering network traffic from automated scanners in accordance with aspects of the present disclosure.

FIG. 3 illustrates an example of a system 300 that supports filtering network traffic from automated scanners in accordance with aspects of the present disclosure. The system 200 may include a device 305 (e.g., an application server), an external application server 310, a load balancer 315, and a data store 370. In some cases, the functions performed by the device 305 (such as application server) may instead be performed by a component of the external application server 310, the load balancer 315, or the data store 370. A user device (not shown) may support an application for data analytics using machine learning models or other models. Specifically, a user device in combination with the device 305 may support an application that provides filtering network traffic from automated scanners using classification by machine learning models. A user operating the user device may interact with the application to train a mathematical model (e.g., artificial intelligence model) at the device 305, where the device 305 may identify results 365 based on classifying network traffic. In some examples, the device 305 may provide the results 365 to a user device (not shown).

According to one or more aspects of the present disclosure, a user device may display an interactive interface for receiving a request (from a marketer) to run a classification model (e.g., machine learning model). In some examples, the user device may display the interactive interface for receiving a request (from a marketer) to train or develop an artificial intelligence model. Alternatively, the device 305 may train or develop a mathematical model (e.g., artificial intelligence model, a machine learning model, etc.) without receiving a request from a user device. In some cases, the interface at the user device may run as a webpage within a web browser (e.g., as a software as a service (SaaS) product). In other cases, the interface may be part of an application downloaded onto the user device. A user operating the user device may input information into the user interface to specify aspects of the request to develop an artificial intelligence model. In some cases, a user may be associated with a user credential or user ID, and the user may log on to the user device using the user credential. In certain aspects, the device 305 (or application server) may not have the requested artificial intelligence model developed at the device 305. Additionally or alternatively, the device 305 may determine a need to develop an artificial intelligence model (e.g., machine learning model) for classifying network traffic. As described herein, the device 305 in conjunction with the external application server 310, the load balancer 315, and the data store 370 may perform a filtering operation 320.

According to one or more aspects of the present disclosure, the filtering operation 320 may be performed by the device 305, such as a server (e.g., an application server, a database server, a server cluster, a virtual machine, a container, etc.). Although not shown in FIG. 3, the filtering operation 320 may be performed by a user device, a data store, or some combination of these or similar devices. In some cases, the device 305 may be a component of a subsystem 125 as described with reference to FIG. 1. The device 305 may support computer aided data science, which may be performed by an artificial intelligence-enhanced data analytics framework. The device 305 may be an example of a general analysis machine and, as such, may perform data analytics and classification of network traffic based on receiving a classification request.

According to one or more aspects of the present disclosure, the external server 310 may receive one or more visitor activity from the load balancer 315. The visitor activity may be based on an interaction activity associated with electronic communication messages delivered to one or more user devices. For example, a user device (such as a user device separate from device 305) may receive an electronic communication message (e.g., from a marketer). The user device (not shown) may receive the electronic communication message (e.g., an email) on an interactive interface. This interface may run as a webpage within a web browser, or the interface may be part of an application downloaded onto the user device. The load balancer 315 may then receive interaction activity information associated with the electronic communication message.

In some examples, the device 305 may receive a classification request 325 from the external server 310. Upon receiving the classification request 325, the device 305 may perform an attribute determination operation 330. As part of the attribute determination operation 330, the device 305 may perform an activity message reception operation 335. For example, the device 305 may receive an activity message associated with an interaction with an electronic communication message. The device 305 may then perform a source and attribute identification operation 340. In some cases, as part of the source and attribute identification operation 340, the device 305 may identify, from the activity message, at least a source identifier of the activity message and one or more attributes associated with the electronic communication message. The source identifier of the activity message may include an IP address associated with the activity message. For example, the device 305 may identify an IP address associated with a device that interacted with the email. The one or more attributes associated with the electronic communication message may include at least one of an account identifier associated with the electronic communication message, an electronic communication message identifier, a timestamp associated with the electronic communication message, an identifier associated with a type of activity, or a combination thereof. In one example, the device 305 may identify a customer associated with the email (i.e., an intended recipient of the email). Additionally or alternatively, the device 305 may identify a time during which the email was accessed by the IP address. The device 305 may further determine an email identifier and/or an identifier of a tracked link included in the email. Additionally or alternatively, the device 305 may determine an identifier of the type of activity performed by the IP address.

According to one or more aspects, the device 305 may perform a mapping operation 345. As part of the mapping operation, the device 305 may perform a timestamp identification operation 350 and a timestamp mapping operation 355. In one example, the device 305 may identify, from the activity message, a timestamp associated with the electronic communication message. Based on the timestamp associated with the electronic communication message, the device 305 may determine a previous time window. As part of the timestamp mapping operation 355, the device 305 may determine that the timestamp corresponds to the previous time window and add the activity message to a mapping of source identifiers and attributes associated with previously received activity messages. In some cases, the device 305 may add the activity message to a mapping associated with the previous time window. For example, the device 305 may maintain a mapping between one or more attributes and the IP address for a time period (e.g., for 2 minutes). Upon identifying an activity from the IP address within the time period, the device 305 updates the mapping to include the activity.

In some examples, the device 305 may perform the classification operation 360 to classify the activity message as being associated with an automated scanner. As part of the classification operation 360, the device may perform a signal evaluation operation 365 and a results generation operation 375. In one example, the device 305 may determine one or more signals associated with the source identifier of the activity message based on the mapping of source identifiers and the attributes associated with previously received activity messages. Additionally or alternatively, the device 305 may identify a set of activity messages associated with the source identifier within the previous time window, where the set of activity messages include a set of interactions of the source identifier with a set of electronic communication messages. That is, the device 305 may identify a pattern of one or more interactions of a particular IP address with multiple emails within a previous time period. The device 305 may then determine the one or more signals based on the set of activity messages associated with the source identifier within the previous time window. In some examples, the set of interactions of the IP address (e.g., source identifier) may include opening of the multiple electronic communication messages within the previous time window, multiple interactions with multiple customers associated with the electronic communication messages, and interactions with a link (e.g., a visible link or an invisible link such as a honeypot link) included in one or more of the electronic communication messages. In some cases, the interactions of the source identifier (such as IP address) may include multiple interactions with a link included in one or more of the electronic communication messages, the one or more of the electronic communication messages being associated with one or more customers. Based on the interaction patterns of the source identifier (or IP address) over a predetermined time period, the device 305 may classify the activity as being associated with an automated scanner. Upon classifying the activity message as being associated with an automated scanner, the device performs results generation operation 375 to generate classification results.

In some examples, the device 305 may transmit, to the external server 310, a classification result based on classifying the activity message. In some cases, the external server 310 may transmit the classification results (using mySQL) to the load balancer 315. Additionally or alternatively, the device 305 may store a list of known automated scanners in the data store 370. Upon determining the classification result, the device 305 may update the data store 370 to include the IP address associated with the received activity message in the known automated scanners.

Figure 4:
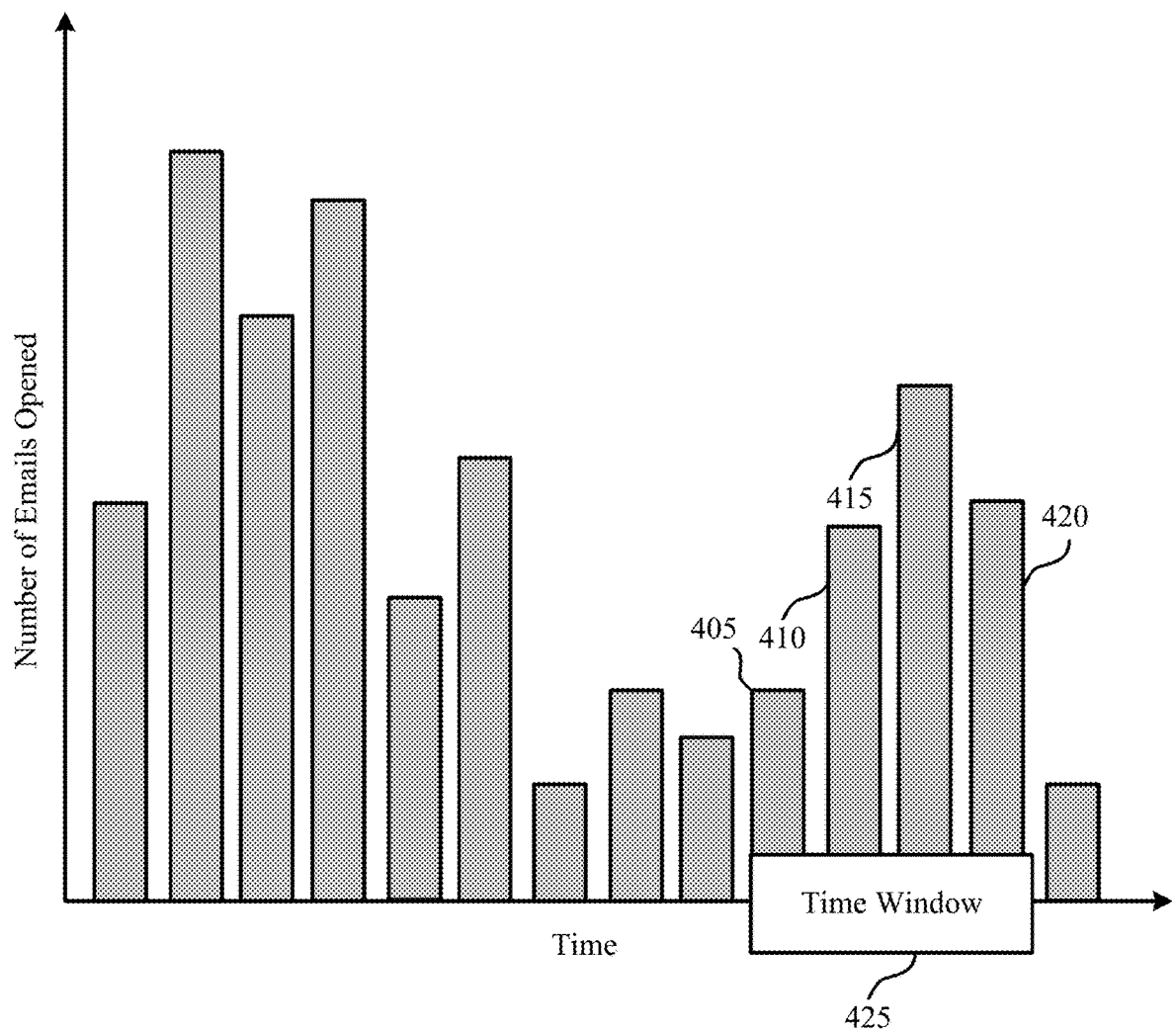
FIG. 4 illustrates an example of a graph that supports filtering network traffic from automated scanners in accordance with aspects of the present disclosure.

FIG. 4 illustrates an example of a graph 400 that supports filtering network traffic from automated scanners in accordance with aspects of the present disclosure. As depicted with reference to FIG. 4, the graph 400 may include a graphical representation of a number of emails opened by a source over a period of time. As described with reference to FIGS. 1, 2, and 3, a device (e.g., a user device, server, server cluster, database, etc.) may receive an activity message associated with an interaction (e.g., open, close, click, etc.) with an email or other electronic communication message (e.g., a marketing email). Upon receiving the activity message, the device may identify at least a source identifier (e.g., an IP address) of the activity message and one or more attributes associated with the email. For instance, the device may identify the IP address of the device interacting with the email and one or more attributes of the email. According to one or more aspects, the device may maintain a mapping between source identifiers and one or more attributes of activity messages. That is, upon receiving a new activity message, the device may add the activity message to the mapping of source identifiers and attributes associated with previously received activity messages. As described herein, the device may develop one or more signals associated with the source identifier (e.g., IP address or network address). The device may determine whether the IP address is associated with an automated scanner (or email security scanner) based on the developed signals.

In the example of FIG. 4, the device may use the signal related to a number of emails opened by the IP address to classify an activity message. As depicted in the example of FIG. 4, the device may maintain a mapping between an IP address and a number of emails accessed by the IP address. For example, for a first timestamp, the number of emails accessed by the IP address may correspond to the bar 405. Similarly, for a second timestamp, the number of emails accessed by the IP address may correspond to the bar 410, for a third timestamp, the number of emails accessed by the IP address may correspond to the bar 415, and for a fourth timestamp, the number of emails accessed by the IP address may correspond to the bar 420. The device may determine a total number of emails accessed by the IP address during the time window 425. As described in the example of FIG. 4, the device may determine that the total number of emails accessed by the IP address during the time window 425 includes a sum of the number of emails corresponding to the bar 405, the number of emails corresponding to the bar 410, the number of emails corresponding to the bar 415, and the number of emails corresponding to the bar 420. In some examples, the device may classify the activity message as being associated with an automated scanner based on a comparison of the received activity message to the mapping over a previous time window. In the example of FIG. 4, if the device determines that a new activity message has the same IP address as the IP addresses associated with the time window 425, and that the new activity message includes opening an email, then the device may classify the activity message as being associated with an automated scanner.

Figure 5:
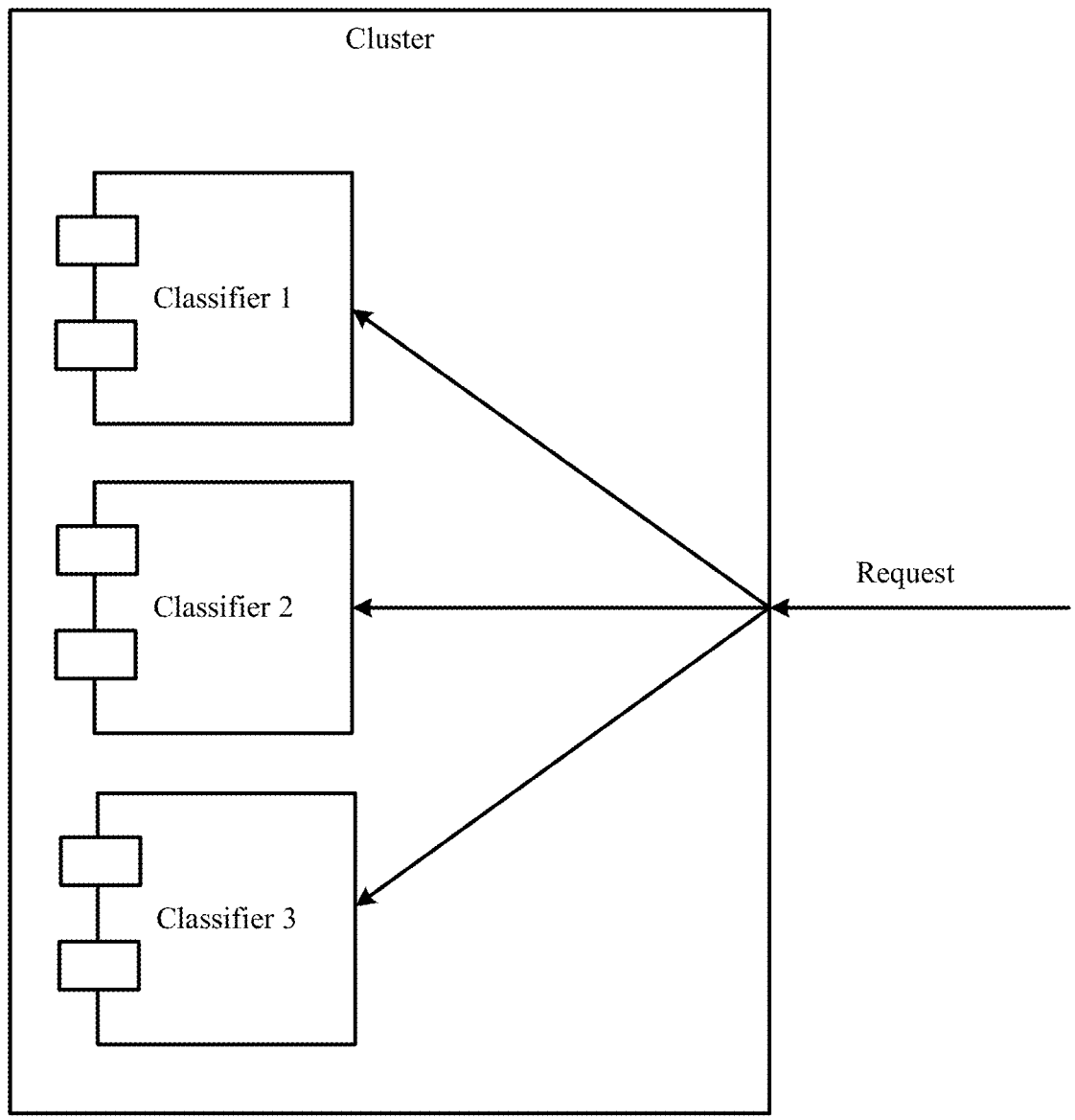
FIG. 5 illustrates an example of a cluster that supports filtering network traffic from automated scanners in accordance with aspects of the present disclosure.

FIG. 5 illustrates an example of a cluster 500 that supports filtering network traffic from automated scanners in accordance with aspects of the present disclosure. As depicted with reference to FIG. 5, the cluster 500 may include multiple classifiers (e.g., Classifier 1, Classifier 2, and Classifier 3).

As described with reference to FIGS. 1, 2, 3, and 4, a device (e.g., a user device, server, server cluster, database, etc.) may receive an activity message associated with an interaction with an electronic communication message. Upon receiving the activity message, the device may identify at least a source identifier (e.g., an IP address) of the activity message and one or more attributes associated with the electronic communication message. According to one or more aspects, the device may add the activity message to the mapping of source identifiers and attributes associated with previously received activity messages. The device may classify the activity message as being associated with an automated scanner based on a comparison of the received activity message to the mapping over a previous time window. In some cases, the device transmits a classification result to an external server.

The cluster 500 of FIG. 5 depicts an example scaling structure for filtering network traffic from automated scanners. For example, the cluster 500 includes three classifiers (e.g., Classifier 1, Classifier 2, and Classifier 3) and an incoming request may be directed to the classifiers (e.g., Classifier 1, Classifier 2, and Classifier 3) in a round robin fashion. For instance, each of the classifiers may be associated with a time slot. If an incoming request corresponds to a timeslot of a particular classifier, then the incoming request may be routed to that classifier. Such an architecture of the cluster 500 may result in resource savings and increase in performance of a system filtering network traffic from automated scanners.

Figure 6:
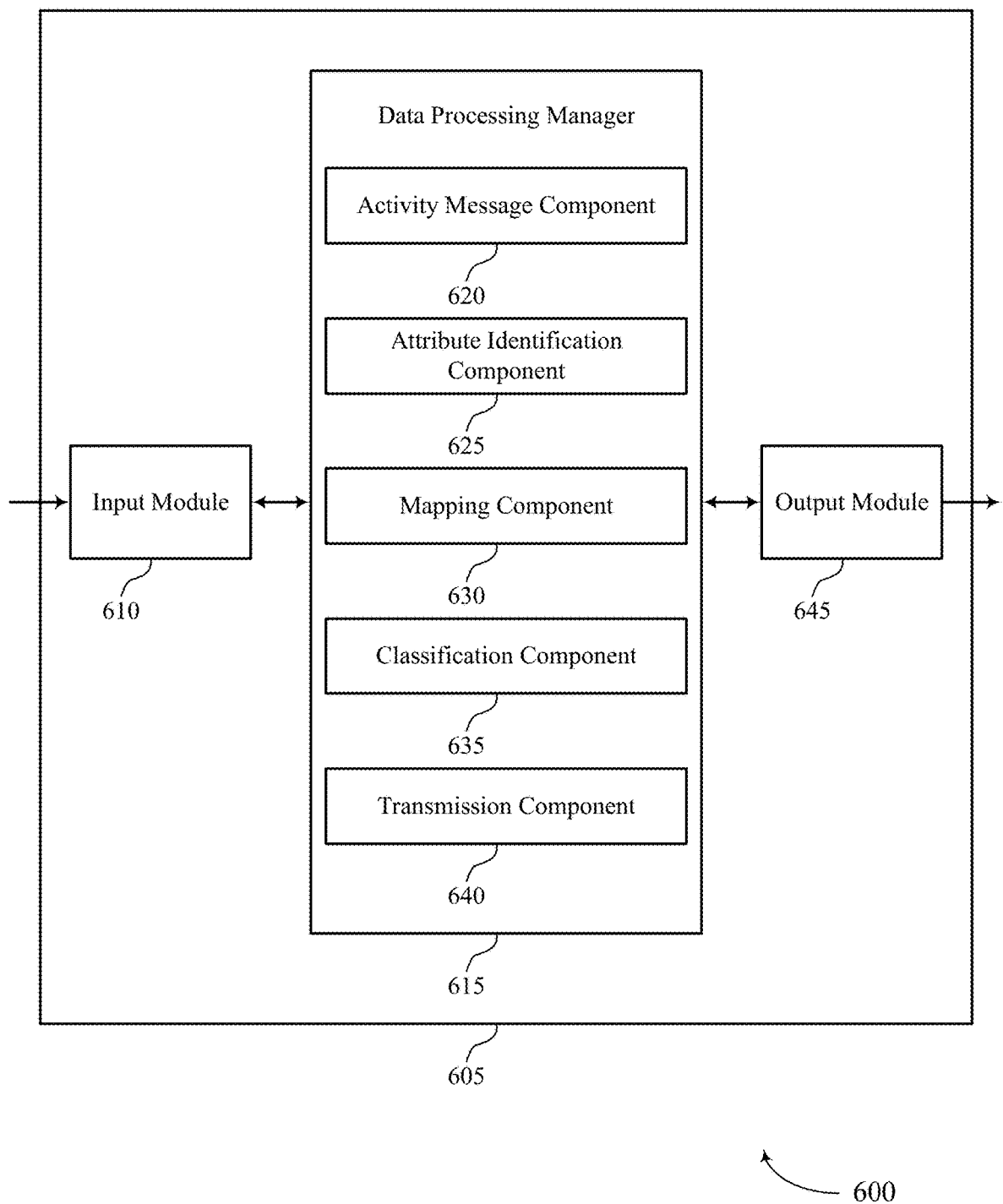
FIG. 6 shows a block diagram of an apparatus that supports filtering network traffic from automated scanners in accordance with aspects of the present disclosure.

FIG. 6 shows a block diagram 600 of an apparatus 605 that supports filtering network traffic from automated scanners in accordance with aspects of the present disclosure. The apparatus 605 may include an input module 610, a data processing manager 615, and an output module 645. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the data processing manager 615 to support data retention handling for data object stores. In some cases, the input module 610 may be a component of an input/output (I/O) controller 815 as described with reference to FIG. 8.

The data processing manager 615 may include an activity message component 620, an attribute identification component 625, a mapping component 630, a classification component 635, and a transmission component 640. The data processing manager 615 may be an example of aspects of the data processing manager 705 or 810 described with reference to FIGS. 7 and 8.

The data processing manager 615 and/or at least some of its various sub-components may be implemented in hardware, software executed by a processor, firmware, or any combination thereof. If implemented in software executed by a processor, the functions of the data processing manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The data processing manager 615 and/or at least some of its various sub-components may be physically located at various positions, including being distributed such that portions of functions are implemented at different physical locations by one or more physical devices. In some examples, the data processing manager 615 and/or at least some of its various sub-components may be a separate and distinct component in accordance with various aspects of the present disclosure. In other examples, the data processing manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The activity message component 620 may receive an activity message associated with an interaction with an electronic communication message. The attribute identification component 625 may identify, from the activity message, at least a source identifier of the activity message and one or more attributes associated with the electronic communication message. The mapping component 630 may add the activity message to a mapping of source identifiers and attributes associated with previously received activity messages.

The classification component 635 may classify the activity message as being associated with an automated scanner based on a comparison of the received activity message to the mapping over a previous time window. The transmission component 640 may transmit, to an external server, a classification result based on classifying the activity message.

The output module 645 may manage output signals for the apparatus 605. For example, the output module 645 may receive signals from other components of the apparatus 605, such as the data processing manager 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
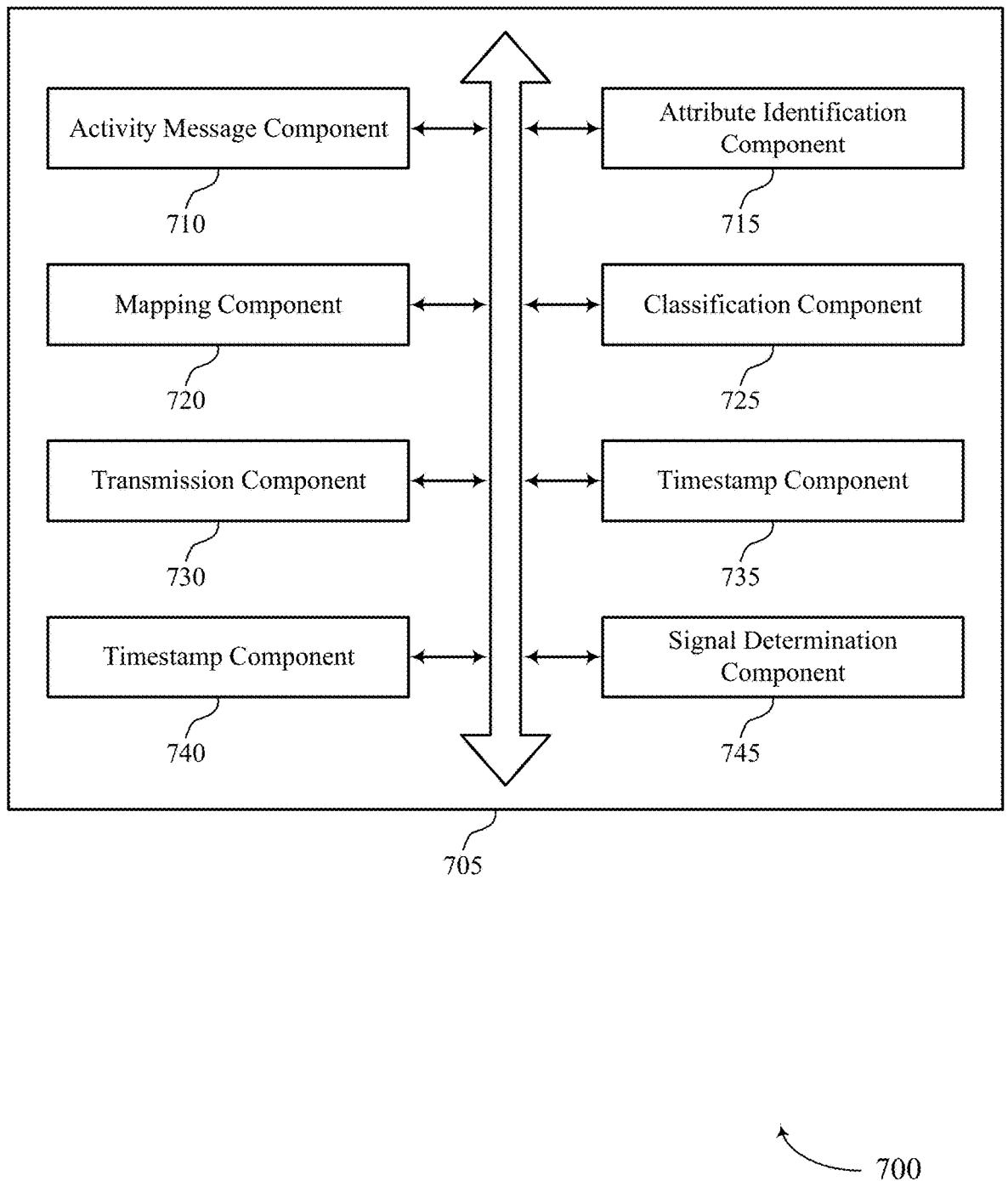
FIG. 7 shows a block diagram of a data processing manager that supports filtering network traffic from automated scanners in accordance with aspects of the present disclosure.

FIG. 7 shows a block diagram 700 of a data processing manager 705 that supports filtering network traffic from automated scanners in accordance with aspects of the present disclosure. The data processing manager 705 may be an example of aspects of a data processing manager 615 or a data processing manager 810 described herein. The data processing manager 705 may include an activity message component 710, an attribute identification component 715, a mapping component 720, a classification component 725, a transmission component 730, a timestamp component 735, a timestamp component 740, and a signal determination component 745. Each of these modules may communicate, directly or indirectly, with one another (e.g., via one or more buses).

The activity message component 710 may receive an activity message associated with an interaction with an electronic communication message. The attribute identification component 715 may identify, from the activity message, at least a source identifier of the activity message and one or more attributes associated with the electronic communication message.

In some cases, the source identifier of the activity message includes an IP address associated with the activity message. In some cases, the one or more attributes associated with the electronic communication message includes at least one of an account identifier associated with the electronic communication message, an electronic communication message identifier, a timestamp associated with the electronic communication message, an identifier associated with a type of activity, or a combination thereof.

The mapping component 720 may add the activity message to a mapping of source identifiers and attributes associated with previously received activity messages. The classification component 725 may classify the activity message as being associated with an automated scanner based on a comparison of the received activity message to the mapping over a previous time window. In some examples, the classification component 725 may receive a classification request from the external server, where classifying the activity message is based at last in part on the classification request. In some cases, the automated scanner includes an email security scanner. The transmission component 730 may transmit, to an external server, a classification result based on classifying the activity message.

The timestamp component 735 may identify, from the activity message, a timestamp associated with the electronic communication message. The timestamp component 740 may determine that the timestamp corresponds to the previous time window, where adding the activity message includes adding the activity message to a mapping associated with the previous time window. In some examples, the timestamp component 740 may determine the previous time window based on the timestamp associated with the electronic communication message.

The signal determination component 745 may determine one or more signals associated with the source identifier of the activity message based on the mapping of source identifiers and the attributes associated with previously received activity messages, where classifying the activity message is based on the one or more signals.

In some examples, the activity message component 710 may identify a set of activity messages associated with the source identifier within the previous time window, where the set of activity messages include a set of interactions of the source identifier with a set of electronic communication messages. In some examples, the signal determination component 745 may determine the one or more signals based on the set of activity messages associated with the source identifier within the previous time window.

In some cases, the set of interactions of the source identifier include opening of the set of electronic communication messages within the previous time window. In some cases, the set of interactions of the source identifier include the set of interactions with a set of customers associated with the set of electronic communication messages. In some cases, the set of interactions of the source identifier include the set of interactions with a link included in one or more of the set of electronic communication messages. In some cases, the set of interactions of the source identifier include the set of interactions with a link included in one or more of the set of electronic communication messages, the one or more of the set of electronic communication messages being associated with one or more customers.

Figure 8:
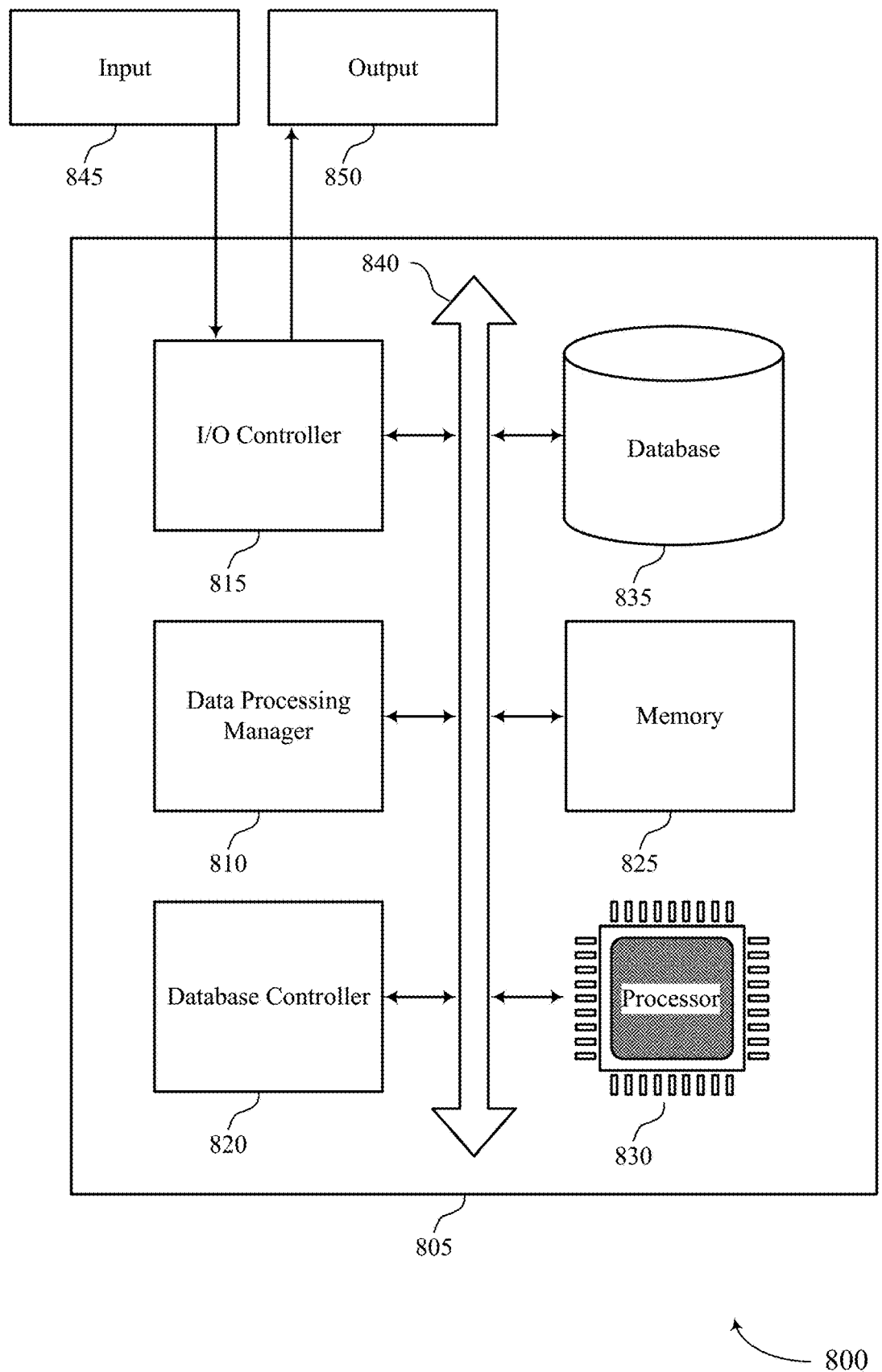
FIG. 8 shows a diagram of a system including a device that supports filtering network traffic from automated scanners in accordance with aspects of the present disclosure.

FIG. 8 shows a diagram of a system 800 including a device 805 that supports filtering network traffic from automated scanners in accordance with aspects of the present disclosure. The device 805 may be an example of or include the components of an application server or an apparatus 605 as described herein. The device 805 may include components for bi-directional data communications including components for transmitting and receiving communications, including a data processing manager 810, an I/O controller 815, a database controller 820, memory 825, a processor 830, and a database 835. These components may be in electronic communication via one or more buses (e.g., bus 840).

The data processing manager 810 may be an example of a data processing manager 615 or 705 as described herein. For example, the data processing manager 810 may perform any of the methods or processes described above with reference to FIGS. 6 and 7. In some cases, the data processing manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting filtering network traffic from automated scanners).

Figure 9:
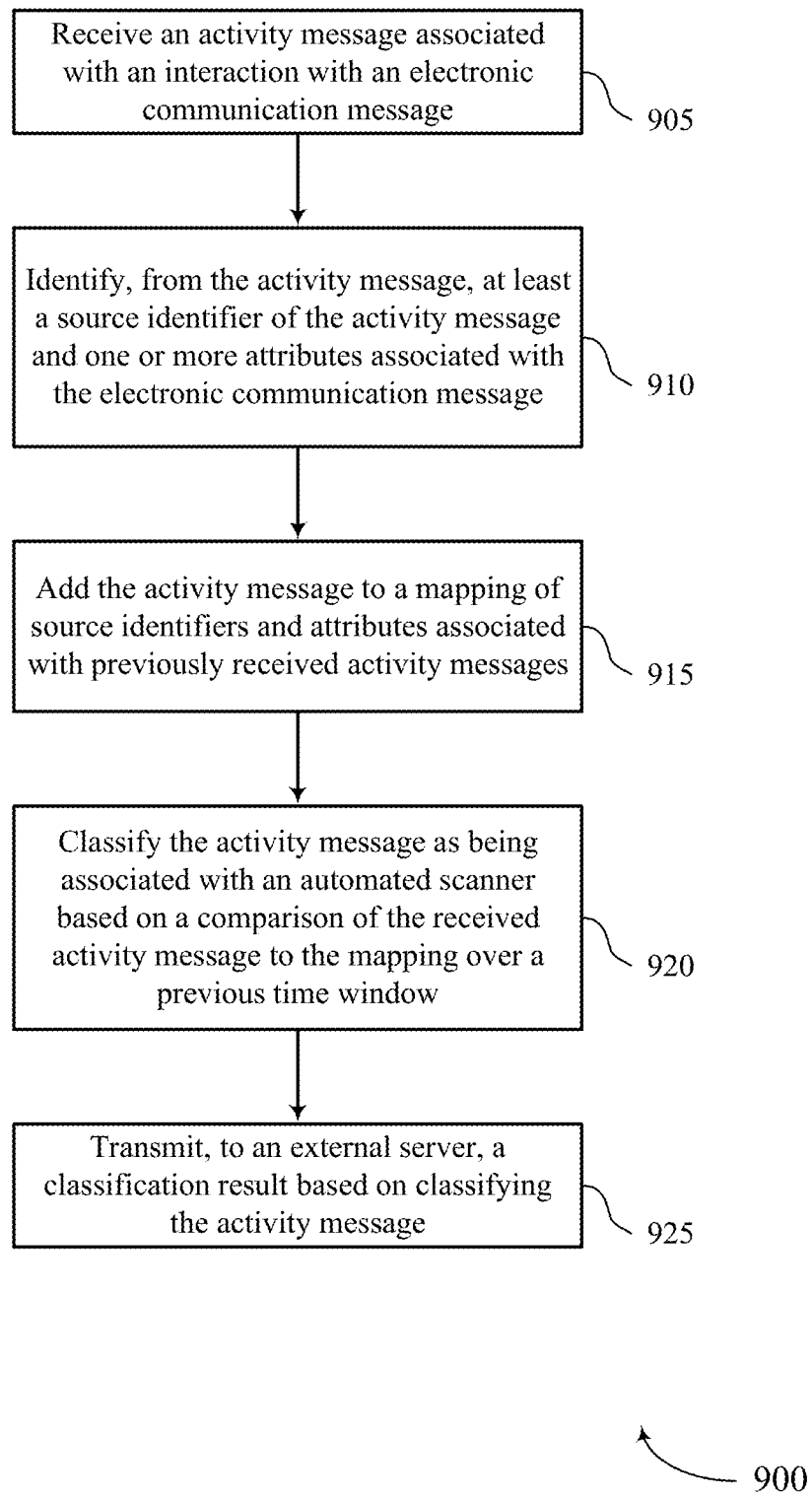
FIGS. 9 through 11 show flowcharts illustrating methods that support filtering network traffic from automated scanners in accordance with aspects of the present disclosure.

FIG. 9 shows a flowchart illustrating a method 900 that supports filtering network traffic from automated scanners in accordance with aspects of the present disclosure. The operations of method 900 may be implemented by an application server or its components as described herein. For example, the operations of method 900 may be performed by a data processing manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 905, the application server may receive an activity message associated with an interaction with an electronic communication message. The operations of 905 may be performed according to the methods described herein. In some examples, aspects of the operations of 905 may be performed by an activity message component as described with reference to FIGS. 6 through 8.

At 910, the application server may identify, from the activity message, at least a source identifier of the activity message and one or more attributes associated with the electronic communication message. The operations of 910 may be performed according to the methods described herein. In some examples, aspects of the operations of 910 may be performed by an attribute identification component as described with reference to FIGS. 6 through 8.

At 915, the application server may add the activity message to a mapping of source identifiers and attributes associated with previously received activity messages. The operations of 915 may be performed according to the methods described herein. In some examples, aspects of the operations of 915 may be performed by a mapping component as described with reference to FIGS. 6 through 8.

At 920, the application server may classify the activity message as being associated with an automated scanner based on a comparison of the received activity message to the mapping over a previous time window. The operations of 920 may be performed according to the methods described herein. In some examples, aspects of the operations of 920 may be performed by a classification component as described with reference to FIGS. 6 through 8.

At 925, the application server may transmit, to an external server, a classification result based on classifying the activity message. The operations of 925 may be performed according to the methods described herein. In some examples, aspects of the operations of 925 may be performed by a transmission component as described with reference to FIGS. 6 through 8.

Figure 10:
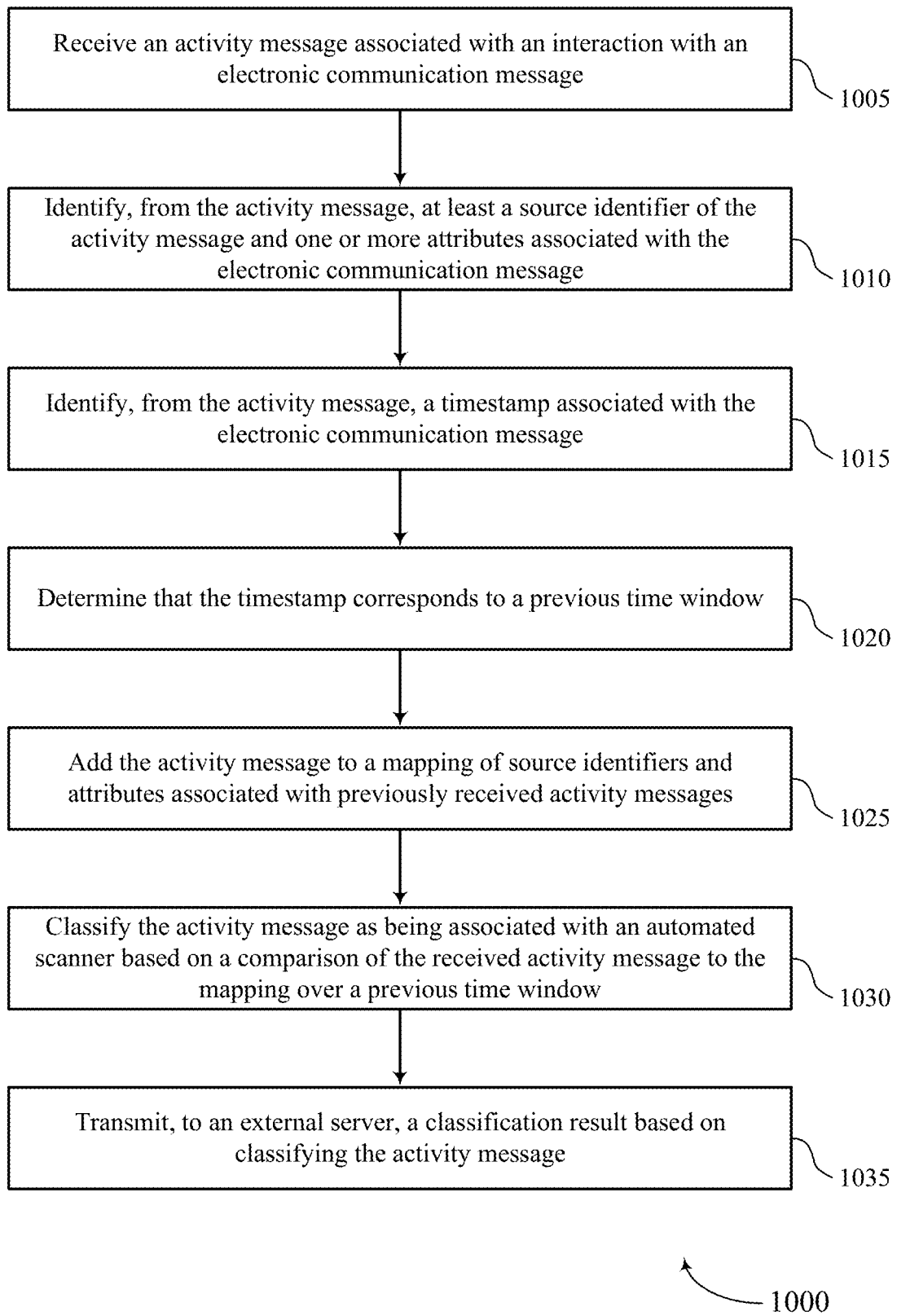

FIG. 10 shows a flowchart illustrating a method 1000 that supports filtering network traffic from automated scanners in accordance with aspects of the present disclosure. The operations of method 1000 may be implemented by an application server or its components as described herein. For example, the operations of method 1000 may be performed by a data processing manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1005, the application server may receive an activity message associated with an interaction with an electronic communication message. The operations of 1005 may be performed according to the methods described herein. In some examples, aspects of the operations of 1005 may be performed by an activity message component as described with reference to FIGS. 6 through 8.

At 1010, the application server may identify, from the activity message, at least a source identifier of the activity message and one or more attributes associated with the electronic communication message. The operations of 1010 may be performed according to the methods described herein. In some examples, aspects of the operations of 1010 may be performed by an attribute identification component as described with reference to FIGS. 6 through 8.

At 1015, the application server may identify, from the activity message, a timestamp associated with the electronic communication message. The operations of 1015 may be performed according to the methods described herein. In some examples, aspects of the operations of 1015 may be performed by a timestamp component as described with reference to FIGS. 6 through 8.

At 1020, the application server may determine that the timestamp corresponds to the previous time window. The operations of 1020 may be performed according to the methods described herein. In some examples, aspects of the operations of 1020 may be performed by a timestamp component as described with reference to FIGS. 6 through 8.

At 1025, the application server may add the activity message to a mapping of source identifiers and attributes associated with previously received activity messages. In some cases, adding the activity message includes adding the activity message to a mapping associated with the previous time window. The operations of 1025 may be performed according to the methods described herein. In some examples, aspects of the operations of 1025 may be performed by a mapping component as described with reference to FIGS. 6 through 8.

At 1030, the application server may classify the activity message as being associated with an automated scanner based on a comparison of the received activity message to the mapping over a previous time window. The operations of 1030 may be performed according to the methods described herein. In some examples, aspects of the operations of 1030 may be performed by a classification component as described with reference to FIGS. 6 through 8.

At 1035, the application server may transmit, to an external server, a classification result based on classifying the activity message. The operations of 1035 may be performed according to the methods described herein. In some examples, aspects of the operations of 1035 may be performed by a transmission component as described with reference to FIGS. 6 through 8.

Figure 11:
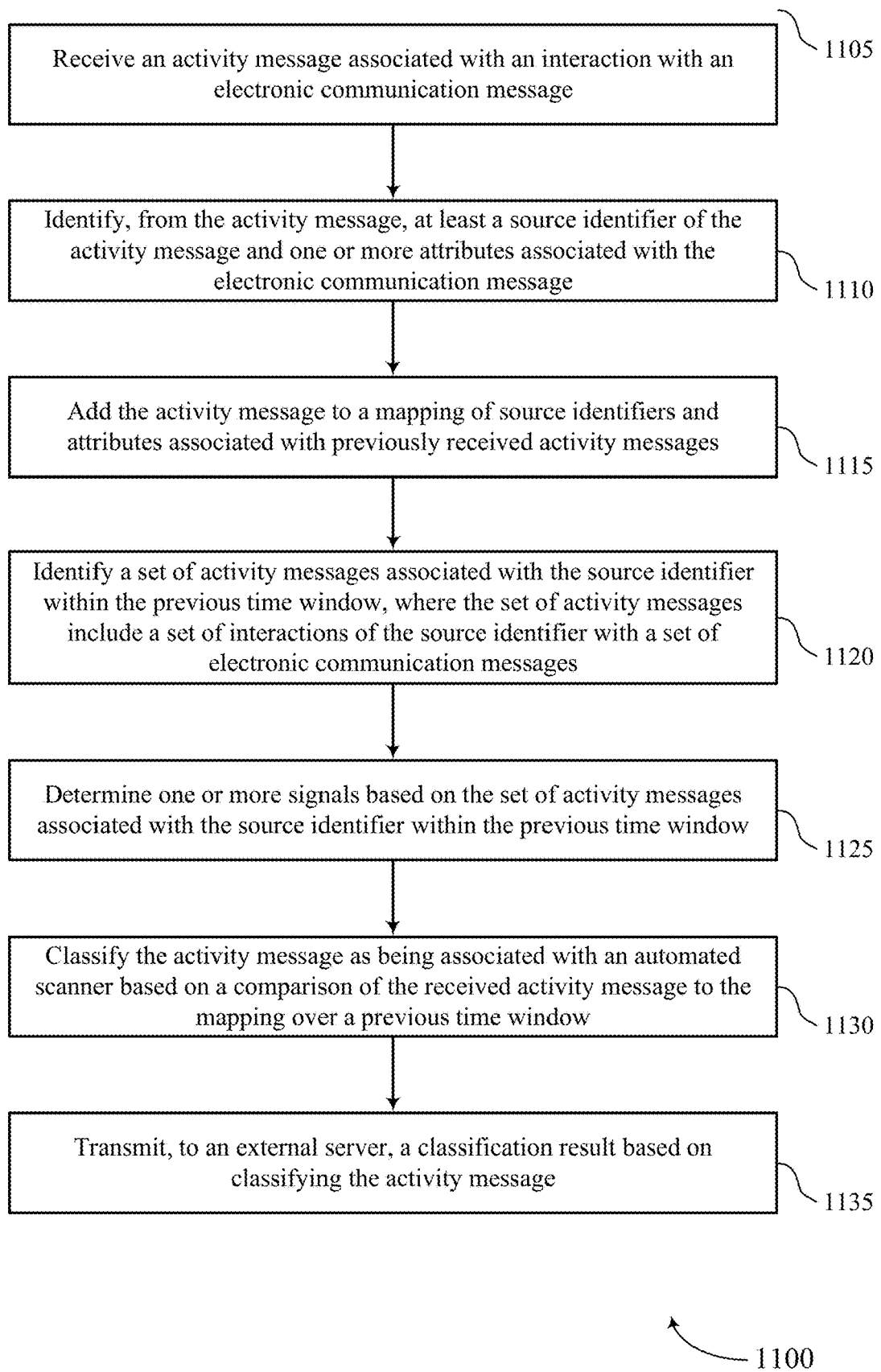

FIG. 11 shows a flowchart illustrating a method 1100 that supports filtering network traffic from automated scanners in accordance with aspects of the present disclosure. The operations of method 1100 may be implemented by an application server or its components as described herein. For example, the operations of method 1100 may be performed by a data processing manager as described with reference to FIGS. 6 through 8. In some examples, an application server may execute a set of instructions to control the functional elements of the application server to perform the functions described below. Additionally or alternatively, an application server may perform aspects of the functions described below using special-purpose hardware.

At 1105, the application server may receive an activity message associated with an interaction with an electronic communication message. The operations of 1105 may be performed according to the methods described herein. In some examples, aspects of the operations of 1105 may be performed by an activity message component as described with reference to FIGS. 6 through 8.

At 1110, the application server may identify, from the activity message, at least a source identifier of the activity message and one or more attributes associated with the electronic communication message. The operations of 1110 may be performed according to the methods described herein. In some examples, aspects of the operations of 1110 may be performed by an attribute identification component as described with reference to FIGS. 6 through 8.

At 1115, the application server may add the activity message to a mapping of source identifiers and attributes associated with previously received activity messages. The operations of 1115 may be performed according to the methods described herein. In some examples, aspects of the operations of 1115 may be performed by a mapping component as described with reference to FIGS. 6 through 8.

At 1120, the application server may identify a set of activity messages associated with the source identifier within the previous time window, where the set of activity messages include a set of interactions of the source identifier with a set of electronic communication messages. The operations of 1120 may be performed according to the methods described herein. In some examples, aspects of the operations of 1120 may be performed by an activity message component as described with reference to FIGS. 6 through 8.

At 1125, the application server may determine the one or more signals based on the set of activity messages associated with the source identifier within the previous time window. The operations of 1125 may be performed according to the methods described herein. In some examples, aspects of the operations of 1125 may be performed by a signal determination component as described with reference to FIGS. 6 through 8.

At 1130, the application server may classify the activity message as being associated with an automated scanner based on a comparison of the received activity message to the mapping over a previous time window. In some cases, classifying the activity message is based on the one or more signals. The operations of 1130 may be performed according to the methods described herein. In some examples, aspects of the operations of 1130 may be performed by a classification component as described with reference to FIGS. 6 through 8.

At 1135, the application server may transmit, to an external server, a classification result based on classifying the activity message. The operations of 1135 may be performed according to the methods described herein. In some examples, aspects of the operations of 1135 may be performed by a transmission component as described with reference to FIGS. 6 through 8.

A method of filtering network traffic at an application server is described. The method may include receiving an activity message associated with an interaction with an electronic communication message, identifying, from the activity message, at least a source identifier of the activity message and one or more attributes associated with the electronic communication message, adding the activity message to a mapping of source identifiers and attributes associated with previously received activity messages, classifying the activity message as being associated with an automated scanner based on a comparison of the received activity message to the mapping over a previous time window, and transmitting, to an external server, a classification result based on classifying the activity message.

An apparatus for filtering network traffic at an application server is described. The apparatus may include a processor, memory coupled with the processor, and instructions stored in the memory. The instructions may be executable by the processor to cause the apparatus to receive an activity message associated with an interaction with an electronic communication message, identify, from the activity message, at least a source identifier of the activity message and one or more attributes associated with the electronic communication message, add the activity message to a mapping of source identifiers and attributes associated with previously received activity messages, classify the activity message as being associated with an automated scanner based on a comparison of the received activity message to the mapping over a previous time window, and transmit, to an external server, a classification result based on classifying the activity message.

Another apparatus for filtering network traffic at an application server is described. The apparatus may include means for receiving an activity message associated with an interaction with an electronic communication message, identifying, from the activity message, at least a source identifier of the activity message and one or more attributes associated with the electronic communication message, adding the activity message to a mapping of source identifiers and attributes associated with previously received activity messages, classifying the activity message as being associated with an automated scanner based on a comparison of the received activity message to the mapping over a previous time window, and transmitting, to an external server, a classification result based on classifying the activity message.

A non-transitory computer-readable medium storing code for filtering network traffic at an application server is described. The code may include instructions executable by a processor to receive an activity message associated with an interaction with an electronic communication message, identify, from the activity message, at least a source identifier of the activity message and one or more attributes associated with the electronic communication message, add the activity message to a mapping of source identifiers and attributes associated with previously received activity messages, classify the activity message as being associated with an automated scanner based on a comparison of the received activity message to the mapping over a previous time window, and transmit, to an external server, a classification result based on classifying the activity message.

Some examples of the method, apparatuses, and non-transitory computer-readable medium described herein may further include operations, features, means, or instructions for identifying, from the activity message, a timestamp associated with the electronic communication message, and determining that the timestamp corresponds to the previous time window, where adding the activity message includes adding the activity message to a mapping associated with the previous time window.

Some examples of the method, apparatuses, and non-transitory computer-readable medium described herein may further include operations, features, means, or instructions for determining the previous time window based on the timestamp associated with the electronic communication message.

Some examples of the method, apparatuses, and non-transitory computer-readable medium described herein may further include operations, features, means, or instructions for determining one or more signals associated with the source identifier of the activity message based on the mapping of source identifiers and the attributes associated with previously received activity messages, where classifying the activity message may be based on the one or more signals.

Some examples of the method, apparatuses, and non-transitory computer-readable medium described herein may further include operations, features, means, or instructions for identifying a set of activity messages associated with the source identifier within the previous time window, where the set of activity messages include a set of interactions of the source identifier with a set of electronic communication messages, and determining the one or more signals based on the set of activity messages associated with the source identifier within the previous time window.

In some examples of the method, apparatuses, and non-transitory computer-readable medium described herein, the set of interactions of the source identifier include opening of the set of electronic communication messages within the previous time window. In some examples of the method, apparatuses, and non-transitory computer-readable medium described herein, the set of interactions of the source identifier include the set of interactions with a set of customers associated with the set of electronic communication messages.

In some examples of the method, apparatuses, and non-transitory computer-readable medium described herein, the set of interactions of the source identifier include the set of interactions with a link included in one or more of the set of electronic communication messages. In some examples of the method, apparatuses, and non-transitory computer-readable medium described herein, the set of interactions of the source identifier include the set of interactions with a link included in one or more of the set of electronic communication messages, the one or more of the set of electronic communication messages being associated with one or more customers.

Some examples of the method, apparatuses, and non-transitory computer-readable medium described herein may further include operations, features, means, or instructions for receiving a classification request from the external server, where classifying the activity message may be based at last in part on the classification request. In some examples of the method, apparatuses, and non-transitory computer-readable medium described herein, the source identifier of the activity message includes an IP address associated with the activity message.

In some examples of the method, apparatuses, and non-transitory computer-readable medium described herein, the one or more attributes associated with the electronic communication message includes at least one of an account identifier associated with the electronic communication message, an electronic communication message identifier, a timestamp associated with the electronic communication message, an identifier associated with a type of activity, or a combination thereof. In some examples of the method, apparatuses, and non-transitory computer-readable medium described herein, the automated scanner includes an email security scanner.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for filtering network traffic at an application server, comprising:
   receiving an activity message associated with an interaction between a source network address and an electronic communication message;
   identifying, from the activity message, at least a source identifier for the source network address and one or more attributes associated with the electronic communication message;
   adding the activity message to a mapping of source identifiers and attributes associated with previously received activity messages received during a previous time window;
   comparing the activity message to a plurality of interactions in accordance with the mapping, wherein the plurality of interactions is between the source network address and a plurality of electronic communication messages within the previous time window;
   classifying the source network address as an automated scanner based at least in part on identifying, in accordance with the comparing, a pattern of interactions of the source network address with the plurality of electronic communication messages within the previous time window; and
   transmitting, to an external server, a classification result based at least in part on classifying the source network address.

2. The method of claim 1, further comprising:
   identifying, from the activity message, a timestamp associated with the electronic communication message; and
   determining that the timestamp corresponds to the previous time window, wherein adding the activity message comprises adding the activity message to the mapping associated with the previous time window.

3. The method of claim 2, further comprising:
   determining the previous time window based at least in part on the timestamp associated with the electronic communication message.

4. The method of claim 1, further comprising:
   determining one or more signals associated with the source identifier of the activity message based at least in part on the mapping of source identifiers and the attributes associated with the previously received activity messages, wherein classifying the source network address is based at least in part on the one or more signals.

5. The method of claim 4, further comprising:
   identifying a plurality of activity messages associated with the source identifier within the previous time window, wherein the plurality of activity messages include the plurality of interactions of the source identifier with the plurality of electronic communication messages; and
   determining the one or more signals based at least in part on the plurality of activity messages associated with the source identifier within the previous time window.

6. The method of claim 5, wherein the plurality of interactions of the source identifier comprise opening of the plurality of electronic communication messages within the previous time window.

7. The method of claim 5, wherein the plurality of interactions of the source identifier comprise the plurality of interactions with a plurality of customers associated with the plurality of electronic communication messages.

8. The method of claim 5, wherein the plurality of interactions of the source identifier comprise the plurality of interactions with a link included in one or more of the plurality of electronic communication messages.

9. The method of claim 5, wherein the plurality of interactions of the source identifier comprise the plurality of interactions with a link included in one or more of the plurality of electronic communication messages, the one or more of the plurality of electronic communication messages being associated with one or more customers.

10. The method of claim 1, further comprising:
    receiving a classification request from the external server, wherein classifying the source network address is based at last in part on the classification request.

11. The method of claim 1, wherein the source identifier of the activity message comprises an Internet Protocol (IP) address associated with the activity message.

12. The method of claim 1, wherein the one or more attributes associated with the electronic communication message comprises at least one of an account identifier associated with the electronic communication message, an electronic communication message identifier, a timestamp associated with the electronic communication message, an identifier associated with a type of activity, or a combination thereof.

13. The method of claim 1, wherein the automated scanner comprises an email security scanner.

14. An apparatus for filtering network traffic at an application server, comprising: a processor, memory coupled with the processor; and instructions stored in the memory and executable by the processor to cause the apparatus to:
receive an activity message associated with an interaction between a source network address and an electronic communication message;
identify, from the activity message, at least a source identifier for the source network address and one or more attributes associated with the electronic communication message;
add the activity message to a mapping of source identifiers and attributes associated with previously received activity messages received during a previous time window;
compare the activity message to a plurality of interactions in accordance with the mapping, wherein the plurality of interactions is between the source network address and a plurality of electronic communication messages within the previous time window;
classify the source network address as an automated scanner based at least in part on identifying, in accordance with the comparing, a pattern of interactions of the source network address with the plurality of electronic communication messages within the previous time window; and
transmit, to an external server, a classification result based at least in part on classifying the source network address.

15. The apparatus of claim 14, wherein the instructions are further executable by the processor to cause the apparatus to:
identify, from the activity message, a timestamp associated with the electronic communication message; and
the instructions to determine that the timestamp corresponds to the previous time window, wherein adding the activity message are executable by the processor to cause the apparatus to add the activity message to the mapping associated with the previous time window.

16. The apparatus of claim 15, wherein the instructions are further executable by the processor to cause the apparatus to:
determine the previous time window based at least in part on the timestamp associated with the electronic communication message.

17. The apparatus of claim 14, wherein the instructions are further executable by the processor to cause the apparatus to:
determine one or more signals associated with the source identifier of the activity message based at least in part on the mapping of source identifiers and the attributes associated with the previously received activity messages, wherein classifying the source network address is based at least in part on the one or more signals.

18. The apparatus of claim 17, wherein the instructions are further executable by the processor to cause the apparatus to:
identify a plurality of activity messages associated with the source identifier within the previous time window, wherein the plurality of activity messages include the plurality of interactions of the source identifier with the plurality of electronic communication messages; and
determine the one or more signals based at least in part on the plurality of activity messages associated with the source identifier within the previous time window.

19. A non-transitory computer-readable medium storing code for filtering network traffic at an application server, the code comprising instructions executable by a processor to:
receive an activity message associated with an interaction between a source network address and with an electronic communication message;
identify, from the activity message, at least a source identifier for the source network address and one or more attributes associated with the electronic communication message;
add the activity message to a mapping of source identifiers and attributes associated with previously received activity messages received during a previous time window;
compare the activity message to a plurality of interactions in accordance with the mapping, wherein the plurality of interactions is between the source network address and a plurality of electronic communication messages within the previous time window;
classify the source network address as an automated scanner based at least in part on identifying, in accordance with the comparing, a pattern of interactions of the source network address with the plurality of electronic communication messages within the previous time window; and
transmit, to an external server, a classification result based at least in part on classifying the source network address.

20. The non-transitory computer-readable medium of claim 19, wherein the instructions are further executable to:
identify, from the activity message, a timestamp associated with the electronic communication message; and
determine that the timestamp corresponds to the previous time window.

* * * * *